US006550177B1

(12) United States Patent
Epple, Jr.

(10) Patent No.: US 6,550,177 B1
(45) Date of Patent: Apr. 22, 2003

(54) HACKLE GRABBER

(76) Inventor: John A. Epple, Jr., 3412 Woodrail Ter., Columbia, MO (US) 65203

( * ) Notice: Subject to any disclaimer, the term of this patent is extended or adjusted under 35 U.S.C. 154(b) by 0 days.

(21) Appl. No.: 10/029,660

(22) Filed: Dec. 18, 2001

(51) Int. Cl.[7] ............................ A01K 97/26; D03J 3/00
(52) U.S. Cl. ............................ 43/4; 289/17; 294/103.1
(58) Field of Search .................... 43/4, 53.5, 1; 289/17; 606/148, 157, 158, 151; 294/100, 99.2, 103.1

(56) References Cited

U.S. PATENT DOCUMENTS

| | | | | |
|---|---|---|---|---|
| 698,370 A | * | 4/1902 | Burrows | 177/232 |
| 2,207,649 A | * | 7/1940 | Williams et al. | 294/100 |
| 2,302,691 A | * | 11/1942 | Green | 294/100 |
| 2,532,972 A | * | 12/1950 | Vertin | 294/100 |
| 2,670,561 A | * | 3/1954 | Howorth et al. | 43/53.5 |
| 2,722,080 A | * | 11/1955 | Lemberger | 43/53.5 |
| 2,785,501 A | * | 3/1957 | Nicholson | 43/53.5 |
| 3,101,964 A | * | 8/1963 | Reaser | 289/17 |
| 3,169,787 A | * | 2/1965 | Zolezzi | 289/17 |
| 3,326,254 A | * | 6/1967 | Diehl | 294/103.1 |
| 3,396,998 A | * | 8/1968 | Scoville | 289/17 |
| 3,603,021 A | * | 9/1971 | Nunley | 43/53.5 |
| 3,625,556 A | * | 12/1971 | Stromberg | 289/17 |
| 4,046,149 A | * | 9/1977 | Komiya | 294/100 |
| 4,573,718 A | * | 3/1986 | Stiver | 289/17 |
| 4,590,702 A | * | 5/1986 | Chestnutt | 43/53.5 |
| 5,300,082 A | * | 4/1994 | Sharpe et al. | 606/147 |
| 5,437,682 A | * | 8/1995 | Grice et al. | 606/148 |
| 5,720,754 A | * | 2/1998 | Middleman et al. | 606/151 |
| 5,897,563 A | * | 4/1999 | Yoon et al. | 606/148 |
| 5,911,717 A | * | 6/1999 | Jacobsen et al. | 606/151 |
| 5,944,730 A | * | 8/1999 | Nobles et al. | 606/151 |
| 6,312,442 B1 | * | 11/2001 | Kieturakis et al. | 606/151 |
| 6,428,558 B1 | * | 8/2002 | Jones et al. | 606/151 |
| 6,434,878 B1 | * | 8/2002 | Milton | 43/4 |

* cited by examiner

Primary Examiner—Darren W. Ark

(57) ABSTRACT

The present invention is a Hackle Grabber which is a fly tying tool used to assist in the clasping and wrapping of materials, such as hackle feathers, peacock herl, tinsel strips, lead wire, and other materials, on the shanks of hooks used for constructing fishing flies. The design of the tool will allow the materials to be wrapped about the shanks of hooks without imparting a twist in the materials each time a wrap is made. The tool is comprised generally of a set of tubes, a spring restrained projectable metal ball, and a rotating handle, all combined so that the metal ball can be made to clasp feathers or small strings of material against one end of a tube, and the tool can itself rotate and wrap the material around a shank without imparting a twist in the material.

1 Claim, 3 Drawing Sheets

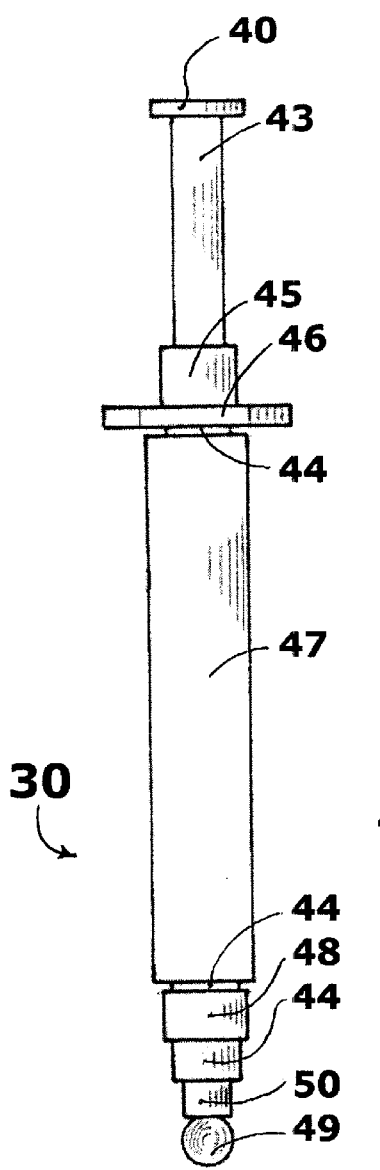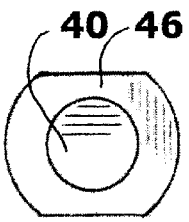
FIG. 3
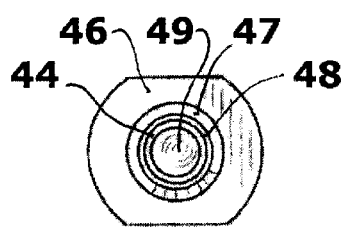
FIG. 4
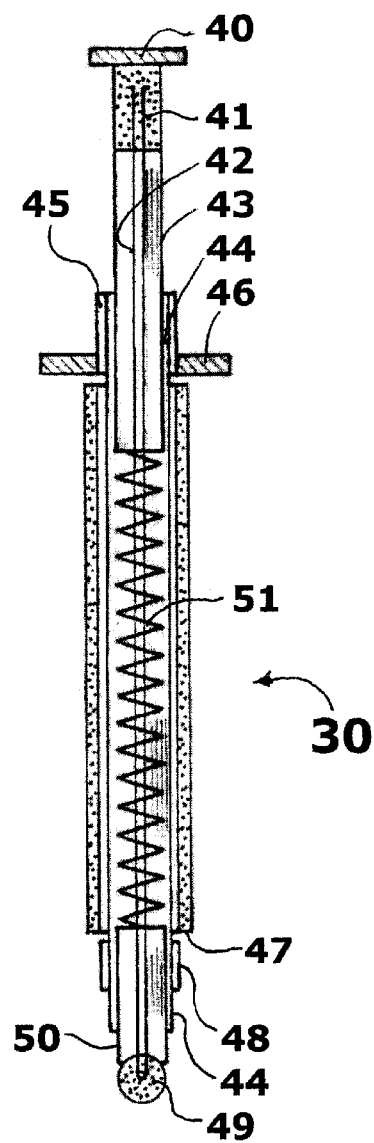
FIG. 1
FIG. 2

HACKLE GRABBER

CROSS REFERENCES TO RELATED APPLICATIONS

There are no patents known to this inventor which include this kind of hackle grabbing tool, although there are numerous types of pliers which have a purpose similar to this Hackle Grabber. The hackle pliers feature a pair of opposing jaws which clamp onto a hackle under manually-applied or spring-actuated lateral pressure. The present invention grabs one end of a hackle feather which has had the other end tied onto the shank of a fishing hook, the grabbing taking place between a small bead and the end of a cylinder, and the bead is forced by spring action onto one end of the hackle as the hackle is positioned on the cylinder end, thereby holding the hackle so it may be wound onto the shank of a hook. Whereas most uses of this tool will involve hackle feathers, this tool can be used in the same manner to hold peacock herl, tinsel strips, lead wires, or other string-like materials as well. The grabbing method of the present invention is uniquely different from all hackle holders known to this inventor.

STATEMENT REGARDING FEDERALLY SPONSORED RESEARCH OR DEVELOPMENT (Not Applicable)

REFERENCE TO A MICROFICHE APPENDIX (Not Applicable)

BACKGROUND—Field of Invention

This invention pertains to the field of fly tying tools, and particularly to the field of fly tying tools which are used to construct flies for fishing purposes. Although there are tools made for accomplishing the same purpose as this invention, this invention is an improvement over those other tools.

BACKGROUND—Description of the Related Art

The presently-made tools used to clasp the end of a hackle feather for winding it on a hook's shank in order to construct a fishing fly may be considered to be broadly defined as one of three types. These are as follows:
1) Hackle pliers made of spring steel rod bent into an elliptical shape which is open at one end. The ends of the rod at the open end are crossed and provided with a jaw on each of the rod ends so manually squeezing the two sides of the ellipse together opens the jaws. When the ellipse is not squeezed, the two jaws are forced tightly together by the compression built into the ellipse, and this compression of one jaw against the other holds a hackle feather tightly so it may be wound on a fishing hook's shank.
2) Hackle pliers made of two spring steel rods fitted into a cylinder in such a way that when the two rods are bound together and pushed into the cylinder, their spring action opens the pliers' opposing jaws which are made on the rod ends. When the rods are partially drawn out of the cylinder, the constriction of the cylinder walls forces the rods, and thereby the pliers' jaws, together so they can grasp a hackle feather for winding it on a fishing hook's shank.
3) Hackle pliers made as in 1) or 2) just above, and equipped with a handle joined by a swivel joint to the pliers, with the handle made so it will let the pliers spin around on the end of the handle. The handle permits a hackle to be wound upon a fishing hook's shank without twisting the shank of the hackle feather one twist for each rotation of the tool around the hook shank. The elimination of the feather shank twist is beneficial because an excess of twists will both deform the feather and/or break it, thereby rendering useless the application of the hackle.

The present invention permits a hackle feather to be held tightly between two rounded surfaces, the bead, and the beveled and rounded edges of the end of the cylinder into which the bead is drawn by spring tension. This results in a firmer grasp than hackle pliers, and, at the same time, less damage to the hackle, which damage may cause the hackle feather to break and thereby became useless. This invention is equipped with a Rotating Handle to eliminate feather shank twist. Because the Rotating Handle of the present invention is only a fraction of an inch distant from the grabbing bead, there is greater control over the positioning of the hackle feather when comparison is made with the handled pliers in example 3) above.

BRIEF SUMMARY OF THE INVENTION

It is the primary object of the present invention to provide an improved means of grasping a hackle feather in order to wind it on the shank of a fish hook when constructing a fishing fly. The present invention provides a fly tier with a tool which will more securely grasp a hackle feather, without subsequent damage, than presently produced hackle pliers, and will allow the fly tier to wind the hackle feather on a hook's shank without twisting the shank of the feather as it is wound. The present invention is constructed in such a manner than its user can easily obtain repair parts, and can easily repair or replace any part with a minimum of skill, and using common household tools. These important objectives are accomplished with the Hackle Grabber comprising the present invention.

The present invention is comprised of two assemblies, Assembly No. 31 and Assembly No. 32, joined with three additional parts to form a third Assembly, Assembly No. 30, the Hackle Grabber itself.

Assembly No. 31 is comprised of a cylindrical Plunger Tube on which a Thumb Cap is fastened. One end of an Elongated "U" Shaped Spring wire is embedded in a Hardened Fill substance inside the Plunger Tube, and this wire extends to a Round Metal Ball, and is embedded in the Round Metal Ball.

Assembly No. 32 is comprised of a cylindrical Barrel Tube at one end of which a Finger Tang Ring is fastened, and at the other end and inside of which a cylindrical Receiver Tube is fastened. The Receiver Tube projects slightly from the Barrel Tube.

The Round Metal Ball is sized so it will almost, but not quite, pass inside the Receiver Tube. It is between the Round Metal Ball and the outer end of the Receiver Tube that a hackle feather is grasped.

Assembly No. 31 is fitted inside Assembly No. 32, with the Round Metal Ball projecting at the Receiver Tube end of Assembly No. 32, and the Plunger Tube, and its Thumb Cap projecting at the Finger Tang Ring end of Assembly No. 32.

A Compression Spring is fitted inside Assembly No. 32 between the Plunger Tube and the Receiver Tube to make the Round Metal Ball pull tightly against the Receiver Tube.

A cylindrical tube is loosely fitted over Assembly No. 32 to serve as a Rotating Handle. A Retainer Tube is fitted tightly over Assembly No. 32 near the Receiver Tube, to keep the Rotating Handle in its place.

When the Thumb Cap is depressed, the Plunger Tube of Assembly No. 31 slides inside the Barrel Tube Assembly No. 32, and the Round Metal Ball is extended.

One end of a hackle feather can be placed inside the loop formed by the Elongated "U" Shaped Spring Wire at the Round Metal Ball.

When pressure on the Thumb Cap is released the hackle feather is grasped between the Round Metal Ball and the Receiver Tube.

The hackle feather may then be wound around a hook's shank.

The Hackle Grabber may also be used to wrap peacock herl, tinsel strips, lead wire, or other materials, around a hook's shank.

BRIEF DESCRIPTION OF THE SEVERAL VIEWS OF THE DRAWINGS

FIG. 1 is a lateral view of the complete Hackle Grabber Assembly No. 30.

FIG. 2 is a longitudinal section view showing the interior of the complete Hackle Grabber Assembly No. 30.

FIG. 3 is an end view of the complete Hackle Grabber Assembly No. 30 at its Plunger Tube end.

FIG. 4 is an end view of the complete Hackle Grabber Assembly No. 30 at its Round Metal Ball end.

PART NUMBERS

Part No. 40 Thumb Cap. (Brass flat washer available at hardware stores.)

Part No. 41 Hardened Fill. (Plaster of Paris available at hardware stores.)

Part No. 42 Elongated "U' Shaped Spring Wire. (Piano wire bent to shape. Available at hardware stores.)

Part No. 43 Plunger Tube. (Cylindrical brass tube cut to length. Available at hardware stores.)

Part No. 44 Barrel Tube. (cylindrical brass tube cut to length. Available at hardware stores.)

Part No. 45 Finger Tang Collar. Cylindrical brass tube cut to length. Available at hardware stores.)

Part No. 46 Finger Tang Ring. (Shaped from brass washer. Available at hardware stores.)

Part No. 47 Rotating Handle. (Cylindrical fiber tube cut to length. Available at craft shops.)

Part No. 48 Retainer Tube. (Cylindrical brass tube cut to length. Available at hardware stores.)

Part No. 49 Round Metal Ball. (perforated fly head. Available at fly tying supply shops.)

Part No. 50 Receiver Tube. (Cylindrical brass tube cut to length. Available at hardware stores.)

Part No. 51 Compression Spring. (Correctly-sized, spring steel tension spring. Available at hardware stores.)

Assembly No. 30 The entire Hackle Grabber.

Assembly No. 31 Plunger Tube Assembly.

Assembly No. 32 Barrel Tube Assembly.

The materials, shapes, sizes, and suppliers of the parts comprising the preferred embodiment of this invention are shown as an aid to persons wishing to make this invention after the patent on it expires. Any other materials, shapes, or sizes which will satisfactorily serve the function of the part may also be used, as the materials, shapes, and sizes shown are not exclusive of others.

DETAILED DESCRIPTION OF THE INVENTION

Referring to FIGS. 1 through 26, a preferred embodiment of this invention is generally designated.

FIG. 1 is an exterior lateral view of the complete Hackle Grabber, showing all its visible exterior parts.

FIG. 2 is a longitudinal sectional view of the Hackle Grabber, showing its exterior parts and interior parts joined together, ready for use.

FIG. 3 is an end view of the complete Hackle Grabber from the Thumb Cap 40 end.

FIG. 4 is an end view of the complete Hackle Grabber from the Round Metal Ball 49 end.

Figure 5:
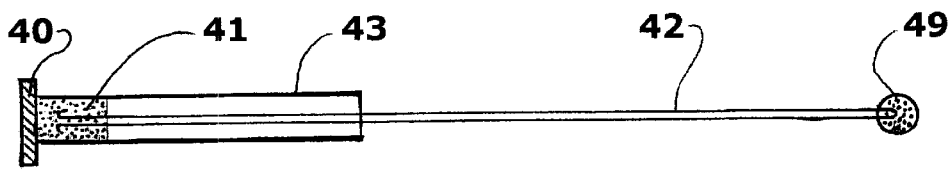
FIG. 5 is a longitudinal section view of Plunger Tube Assembly No. 31.

FIG. 5 is a longitudinal sectional view of the plunger Assembly No. 31, the Thumb Cap 40 is attached with solder to the Plunger Tube 43. At the Thumb Cap 40 end of Plunger Tube 43 is a Hardened Fill 41 of Plaster of Paris in which the Elongated "U" Shaped Spring Wire 42 is embedded. Round Metal Ball 49 is attached to Elongated "U" Shaped Spring Wire 42 through a tapered hole preformed by the manufacturer of the Round Metal Ball 49 in Round Metal Ball 49. A glue-soaked knot of string on the Elongated "U" Shaped Spring Wire 42 may be needed to prevent part No. 42 from being pulled out of the tapered hole in Round Metal Ball 49. Because each end of the Plunger Tube Assembly 31 is larger than the interior diameter of Barrel Tube 44, inside which Plunger Tube Assembly 31 must fit, either one of two different methods must be used to properly position the Plunger Tube Assembly 43 inside Barrel Tube Assembly No. 32. The first method which may be used is to completely assemble all the parts of the Hackle Grabber, except for the attachment of the Round Metal Ball 49. Then the Plunger Tube Assembly 31 can be depressed so as to extend the Elongated "U" Shaped Spring Wire 42, and the Round Metal Ball can be attached to complete the Hackle Grabber. The second method is to completely assemble the Hackle Grabber, except for embedding the Elongated "U" Shaped Spring Wire 42 in the Hardened Fill 41. Then liquefied Hardened Fill 41 can be carefully poured into the capped Plunger Tube 43, and the Elongated "U" Shaped Spring Wire 42 can sink into the temporarily liquid Hardened Fill 41, and the passage of time will then leave Hardened Fill 41 hard, and all the parts assembled.

Figure 6:
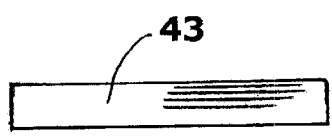
FIG. 6 is a lateral view of the Plunger Tube.

FIG. 6 is a lateral view of the exterior of Plunger Tube 43 before any attachments are made on it. The exterior diameter of Plunger Tube 43 is of a size which will fit snugly, but easily moveable, inside Barrel Tube 44.

Figure 7:
FIG. 7 is an end view of the Plunger Tube.

FIG. 7 is an exterior end view of Plunger Tube 43.

Figure 8:
FIG. 8 is a lateral view of the Round Metal Ball.

FIG. 8 is a view of lateral exterior view of Round Metal Ball 49. A tapered hole in Round Metal Ball 49 is not shown due to its minute size, but the wide part of the tapered hole is opposite the Hackle Grabber, and the narrow part of the tapered hole is towards the Hackle Grabber. The Round Metal Ball 49 is available in various diameters and various metals at stores which sell the components for making fishing flies. The diameter used must be such that the Round Metal Ball 49 will almost, but not quite, fit inside Receiver Tube 50. Stainless steel is the preferred metal for the Round Metal Ball 49.

Figure 9:
FIG. 9 is an edge view of the Thumb Cap.

FIG. 9 is an edge view of Thumb Cap 40. Thumb Cap 40 may be copper or brass, with brass preferred. Thumb Cap 40 is soldered to Plunger Tube 43, with a flat side of Thumb Cap 40 centered on one end of Plunger Tube 43. Thumb Cap 40 is used as a push point to depress the Plunger Tube Assembly 31.

Figure 10:
FIG. 10 is a plan view of the Thumb Cap.

FIG. 10 is a view of a flat side of Thumb Cap 40.

Figure 11:
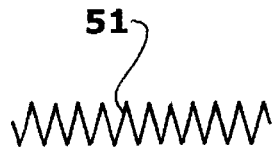
FIG. 11 is a lateral view of the Compression Spring.

FIG. 11 is a lateral view of a Compression Spring 51. This spring provides the resistance of depressing the Plunger Tube Assembly 31, and the tension for drawing Round Metal Ball 49 tightly against the end of Receiver Tube 50. Compression Spring 51 must be judiciously selected in order for it to meet the appropriate dual function for resistance and tension.

Figure 12:
FIG. 12 is an end view of the Compression Spring.

FIG. 12 is an end view of Compression Spring 51. The outer diameter of Compression Spring 51 must be such that it easily slides inside Barrel Tube 44, while being constrained by Receiver Tube 50 and Plunger Tube 44.

Figure 13:
FIG. 13 is a lateral view of the Elongated "U" Shaped Spring Wire.

FIG. 13 is a lateral view of the Elongated "U" Shaped Spring Wire. This part connects Round Metal Ball 49 and Hardened Fill 41, and serves as both a push rod and a pull rod for Round Metal Ball 49.

Figure 14:
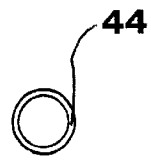
FIG. 14 is an end view of the Barrel Tube.

FIG. 14 is and end view of Barrel Tube 44. The outer diameter of Barrel Tube 44 must fit loosely inside Rotating Handle 47, and the inner diameter of Barrel Tube 44 must fit snugly but moveably over Plunger Tube 43 and Receiver Tube 50.

Figure 15:
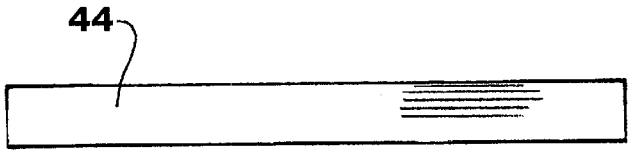
FIG. 15 is a lateral view of the Barrel Tube.

FIG. 15 is a lateral view of the exterior of Barrel Tube 44.

Figure 16:
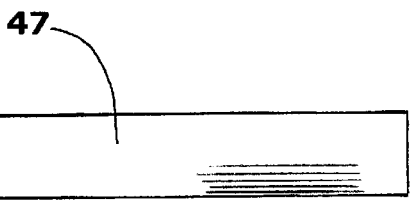
FIG. 16 s a lateral view of the Rotating Handle.

FIG. 16 is a lateral view of the exterior of Rotating Handle 47. The inside diameter of this part must be such that it fits over Barrel Tube 44, and easily rotates around Barrel Tube 44. The wall thickness of Rotating Handle 47 is relatively unimportant, but should not be so great as to make the Hackle Grabber overly bulky, nor so thin as to be easily broken.

Figure 17:
FIG. 17 is an end view of the Rotating Handle.

FIG. 17 is an end view of Rotating Handle 47.

Figure 18:
FIG. 18 is a lateral view of the Finger Tang Collar.

FIG. 18 is a lateral exterior view of Finger Tang Collar 45. Its outside diameter must fit over Barrel Tube 44, and be sized so it can be effectively soldered to Barrel Tube 44.

Figure 19:
FIG. 19 is an end view of the Finger Tang Collar.

FIG. 19 is an end view of Finger Tang Collar 45.

Figure 20:
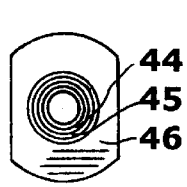
FIG. 20 is an end view of Barrel Assembly No. 32 at the Finger Tang end.

FIG. 20 is an end view of Barrel Assembly No. 32 at the Finger Tang end.

Figure 21:
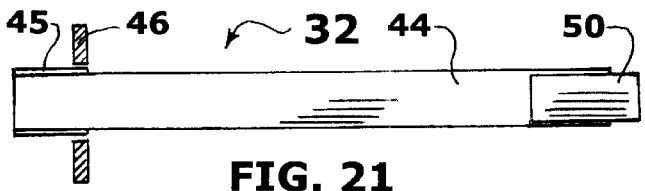
FIG. 21 is a longitudinal section view showing the interior of Barrel Assembly No. 32.

FIG. 21 is a longitudinal section view of Barrel Tube Assembly 32, showing its several component parts. The four parts are joined by soldering.

Figure 22:
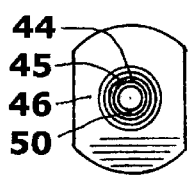
FIG. 22 is an end view of Barrel Assembly No. 32 at the Receiver Tube end.

FIG. 22 is an end view of Barrel Assembly No. 32 at the Receiver Tube end.

Figure 23:
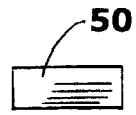
FIG. 23 is a lateral view of the Receiver Tube.

FIG. 23 is a lateral exterior view of Receiver Tube 50. It must fit inside Barrel Tube 44, and be sized so it can be effectively soldered to Barrel Tube 44. Receiver Tube 50 must be sized so it will just barely exclude the entry of Round Metal Ball 49. The end of Receiver Tube 50, where it will have Round Metal Ball 49 seated, must not have a sharp edge, for this would tend to cut a hackle feather, and this would make the Hackle Grabber useless. Instead, the end must be quite smooth and rounded to present a non-sharp edge to a hackle feather.

Figure 24:
FIG. 24 is an end view of the Receiver Tube.

FIG. 24 is an end view of Receiver Tube 50.

Figure 25:
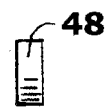
FIG. 25 is a lateral view of the Retainer Tube.

FIG. 25 is a lateral exterior view of Retainer Tube 48. It serves to keep Rotating Handle 47 in its proper position. Its inside diameter must slip tightly over Barrel Tube 44, so that it will slip on Barrel Tube 44 only if a considerable force is exerted. The slippage restriction can be obtained by slightly deforming Retainer Tube 48. The slippage of Retainer Tube 48 is necessary in order to allow its removal, thereby releasing Rotating Handle 47 for cleaning and lubrication.

Figure 26:
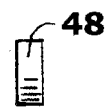
FIG. 26 is an end view of the Retainer Tube.

FIG. 26 is an end view of Retainer Tube 48.

Figure 27:
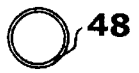
FIG. 27 is an edge view of the Finger Tang Ring.

FIG. 27 is an edge view of Finger Tang Ring 46. This part serves as a grip for the fingers when the thumb depresses the plunger Assembly 31. It can be constructed from an ordinary flat brass washer in which the central opening will fit around Finger Tang Collar 45 for effective soldering. Two opposite edges of the washer forming Finger Tang Ring 46 are flattened by removing a small amount of material, and these serve to prevent undesired rolling of the Hackle Grabber when it is placed on a flat surface during the times it is not in use.

Figure 28:
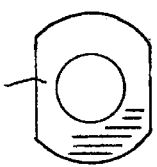
FIG. 28 is a plan view of the Finger Tang Ring.

FIG. 28 is a view of the flat side of Finger Tang Ring 46.

Figure 29:
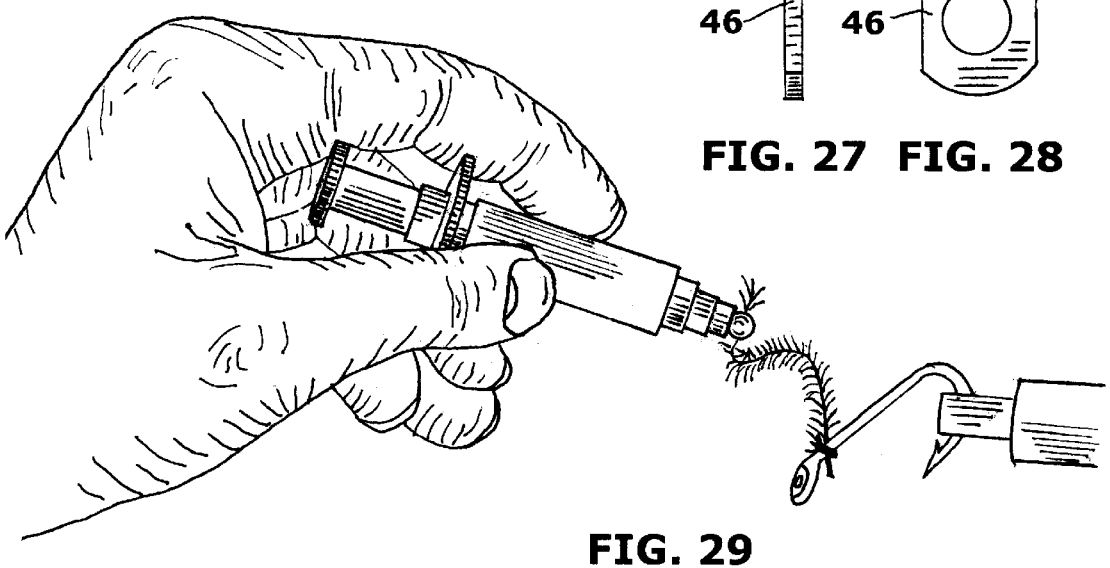
FIG. 29 is a view showing a user's hand holding the Hackle Grabber while it is being used. A hackle feather is clasped behind the round metal ball. The butt of the hackle feather is tied to a fish hook held in a fly vise. The arrows show the movement which will be needed to wrap the hackle feather around the fish hook.

FIG. 29 is a view showing the user's hand holding a Hackle Grabber. The Hackle grabber has a hackle feather clasped behind its round metal ball. The hackle feather has been tied.

What is claimed is:

1. A tool for holding and wrapping hackle feathers, peacock herl, tinsel strips, lead wire, or other materials around the shanks of hooks being used to construct fishing flies, the tool comprising:

a barrel assembly comprising a cylindrical barrel tube having an inner surface, an outer surface, a first proximal end, and a second distal end, a finger tang collar circumscribing the outer surface at the first proximal end and secured thereto, a finger tang ring for providing a finger grip which circumscribes the finger tang collar, and a receiver tube having a first proximal end and a second distal end, the receiver tube secured to the inner surface of the cylindrical barrel tube at the second distal end such that at least a portion of the second distal end of the receiver tube extends outwardly from the cylindrical barrel tube at the second distal end;

a plunger assembly comprising an elongated U-shaped spring wire having a first proximal end and a second distal end, a plunger tube with a first proximal end and a second distal end, fill material located within the plunger tube at the first proximal end and the first proximal end of the U-shaped spring wire embedded in the fill material so as to secure the U-shaped spring wire to the plunger tube, a thumb cap secured to the first proximal end of the plunger tube, a round metal ball with a hole, the second distal end of the U-shaped spring wire extending into the hole of the round metal ball and secured thereto;

a rotating handle comprising a cylindrical member with a first proximal end and a second distal end, the cylindrical member positioned around the outer surface of the cylindrical barrel tube between the first proximal and second distal ends of the cylindrical barrel tube and having an inside diameter which allows the rotating handle to rotate around the cylindrical barrel tube;

a retainer tube for retaining the rotating handle on the cylindrical barrel tube which is positioned around the outer surface of the cylindrical barrel tube between the second distal end of the cylindrical member and the second distal end of the cylindrical barrel tube, the retainer tube having an inside diameter such that it fits tightly over the cylindrical barrel tube;

a compression spring positioned within the cylindrical barrel and acting between the second distal end of the plunger tube and the first proximal end of the receiver tube;

the plunger assembly being slidably disposed within the barrel assembly and the spring biasing the plunger assembly toward the first proximal end of the cylindrical barrel tube such that the first proximal end of the plunger tube and the thumb cap extend away from the first proximal end of the cylindrical barrel tube and such that the round metal ball is biased against the receiver tube, the round metal ball having an outer diameter which is larger than an inner diameter of the receiver tube such that a portion abuts the receiver tube and another portion extends outwardly from the receiver tube; and wherein when a user depresses the thumb cap, the spring is compressed and the round metal ball is extended outwardly away from the second distal end of the receiver tube so as to provide a receiving area in which fly tying material may be received, the user then gradually releases the thumb cap which retracts the round metal ball until it abuts against the receiver tube so as to hold the fly tying material thereat, the user may then wind the fly tying material on a hook shank without twisting the feather as it is wound.

* * * * *